US 7,574,082 B2

(12) United States Patent
Xia et al.

(10) Patent No.: US 7,574,082 B2
(45) Date of Patent: Aug. 11, 2009

(54) OPTICAL POWER MONITORING WITH ROBOTICALLY MOVED MACRO-BENDING

(75) Inventors: Tiejun J. Xia, Richardson, TX (US); Glenn A. Wellbrock, Wylie, TX (US)

(73) Assignee: Verizon Services Organization Inc., Irving, TX (US)

( * ) Notice: Subject to any disclaimer, the term of this patent is extended or adjusted under 35 U.S.C. 154(b) by 8 days.

(21) Appl. No.: 11/692,468

(22) Filed: Mar. 28, 2007

(65) Prior Publication Data
US 2008/0239295 A1    Oct. 2, 2008

(51) Int. Cl.
*G02B 6/26* (2006.01)
(52) U.S. Cl. .......................... 385/32; 385/140
(58) Field of Classification Search ............. 385/88–89, 385/14–18, 24, 39, 48; 901/44
See application file for complete search history.

(56) References Cited
U.S. PATENT DOCUMENTS

| | | | | |
|---|---|---|---|---|
| 4,545,253 A | * | 10/1985 | Avicola | 73/655 |
| 4,672,198 A | * | 6/1987 | Presby | 356/73.1 |
| 4,798,461 A | * | 1/1989 | Pavlin et al. | 356/138 |
| 4,840,482 A | * | 6/1989 | Shigematsu et al. | 356/73.1 |
| 4,856,864 A | * | 8/1989 | Campbell, et al. | 398/200 |
| 4,900,921 A | * | 2/1990 | Spillman, Jr. | 250/227.21 |
| 4,902,083 A | * | 2/1990 | Wells | 359/214 |
| 4,936,649 A | * | 6/1990 | Lymer et al. | 385/13 |
| 4,956,550 A | * | 9/1990 | Edwards et al. | 250/227.15 |
| 5,009,482 A | * | 4/1991 | Lincoln | 385/35 |
| 5,029,965 A | * | 7/1991 | Tan | 385/90 |
| 5,148,233 A | * | 9/1992 | Imamura et al. | 356/243.1 |
| 5,202,746 A | * | 4/1993 | Sentsui et al. | 356/73.1 |
| 5,231,686 A | * | 7/1993 | Rabinovich | 385/93 |
| 5,291,112 A | * | 3/1994 | Karidis et al. | 318/568.1 |
| 5,309,537 A | * | 5/1994 | Chun et al. | 385/59 |
| 5,315,384 A | * | 5/1994 | Heffington et al. | 348/93 |
| 5,321,258 A | * | 6/1994 | Kinney | 250/227.21 |
| 5,383,118 A | * | 1/1995 | Nguyen | 700/59 |
| 5,705,814 A | * | 1/1998 | Young et al. | 250/306 |
| 5,742,715 A | * | 4/1998 | Boehlke et al. | 385/32 |
| 5,790,285 A | * | 8/1998 | Mock | 398/21 |
| 5,857,049 A | * | 1/1999 | Beranek et al. | 385/91 |
| 6,307,983 B1 | * | 10/2001 | Goossen | 385/16 |
| 6,457,359 B1 | * | 10/2002 | Suzuki | 73/579 |
| 6,490,392 B1 | * | 12/2002 | Munekata et al. | 385/31 |
| 6,493,072 B1 | * | 12/2002 | Medberry et al. | 356/73.1 |
| 6,547,454 B2 | * | 4/2003 | Wickman et al. | 385/88 |
| 6,556,751 B1 | * | 4/2003 | Lee et al. | 385/50 |
| 6,597,843 B2 | * | 7/2003 | Johnson | 385/52 |
| 6,674,074 B2 | * | 1/2004 | Schwartz | 250/306 |
| 6,722,033 B2 | * | 4/2004 | Koster et al. | 29/861 |
| 6,737,646 B2 | * | 5/2004 | Schwartz | 250/306 |
| 6,795,461 B1 | * | 9/2004 | Blair et al. | 372/36 |

(Continued)

FOREIGN PATENT DOCUMENTS

JP            01057155 A    *    3/1989

*Primary Examiner*—James P Hughes
*Assistant Examiner*—Peter Radkowski

(57) ABSTRACT

A method may include bending a first optical fiber of a plurality of optical fibers; measuring light leaked from the first optical fiber with a photo detector; robotically moving the photo detector to a second optical fiber of the plurality of optical fibers; bending the second optical fiber; and measuring light leaked from the second other optical fiber with the photo detector.

25 Claims, 16 Drawing Sheets

U.S. PATENT DOCUMENTS

| | | | |
|---|---|---|---|
| 6,941,034 B2* | 9/2005 | Kuboi | 385/17 |
| 7,002,131 B1* | 2/2006 | Lewis | 250/214 A |
| 7,126,696 B2* | 10/2006 | Tobiason | 356/499 |
| 7,186,567 B1* | 3/2007 | Sutherland et al. | 436/532 |
| 7,380,995 B2* | 6/2008 | Chan | 385/92 |
| 2002/0109831 A1* | 8/2002 | Van Nguyen et al. | 356/73.1 |
| 2003/0005755 A1* | 1/2003 | Schwartz | 73/105 |
| 2003/0215181 A1* | 11/2003 | Lee | 385/33 |
| 2003/0218737 A1* | 11/2003 | Gogolla et al. | 356/3.03 |
| 2004/0071420 A1* | 4/2004 | Sezerman et al. | 385/123 |
| 2004/0093516 A1* | 5/2004 | Hornbeek et al. | 713/201 |
| 2004/0108446 A1* | 6/2004 | Hildebrandt | 250/227.14 |
| 2004/0119037 A1* | 6/2004 | Mentzer | 250/573 |
| 2004/0160886 A1* | 8/2004 | Ma et al. | 369/112.27 |
| 2006/0125068 A1* | 6/2006 | Abbink | 257/686 |
| 2007/0086017 A1* | 4/2007 | Buckland et al. | 356/497 |
| 2007/0097835 A1* | 5/2007 | Ophey et al. | 369/112.21 |

* cited by examiner

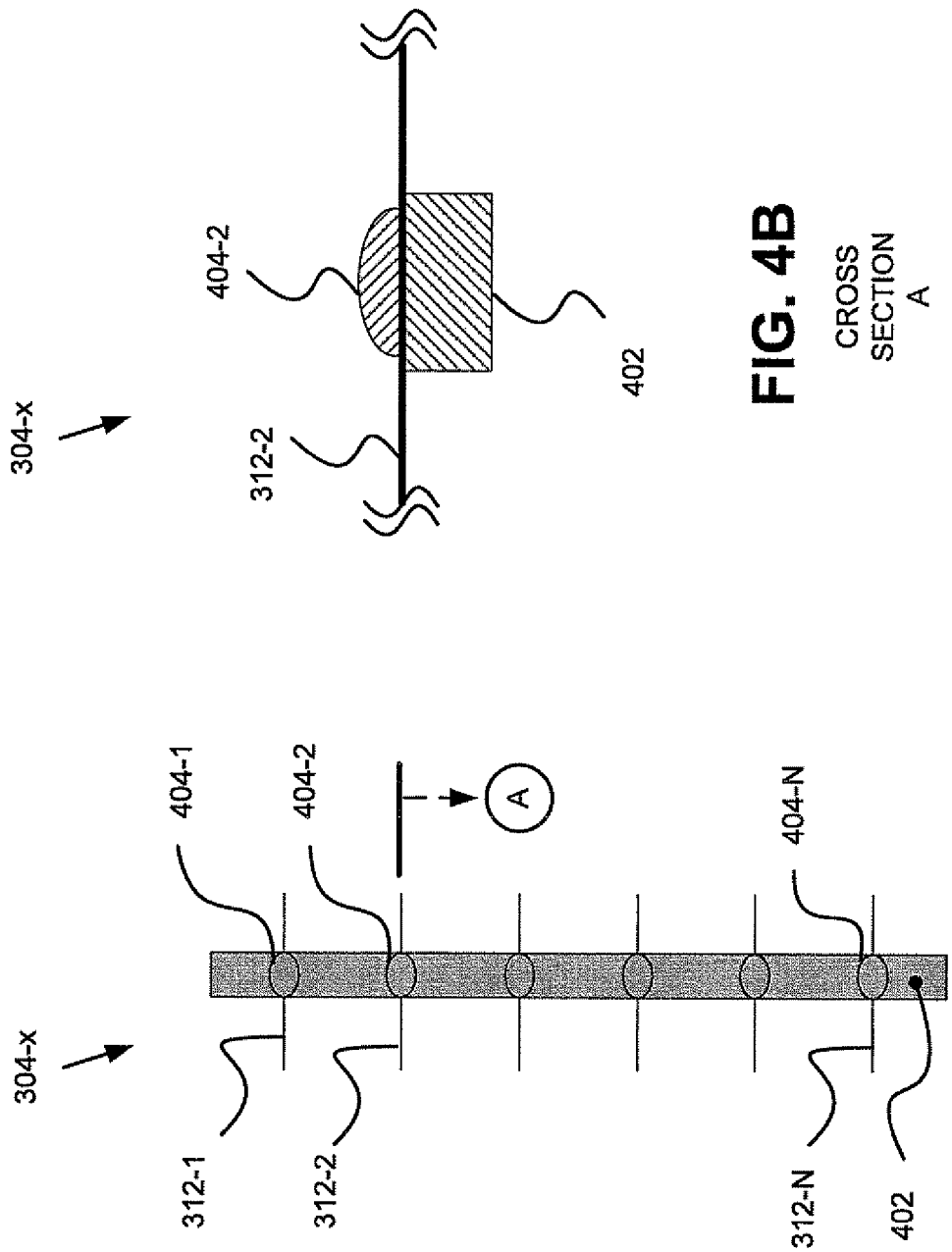

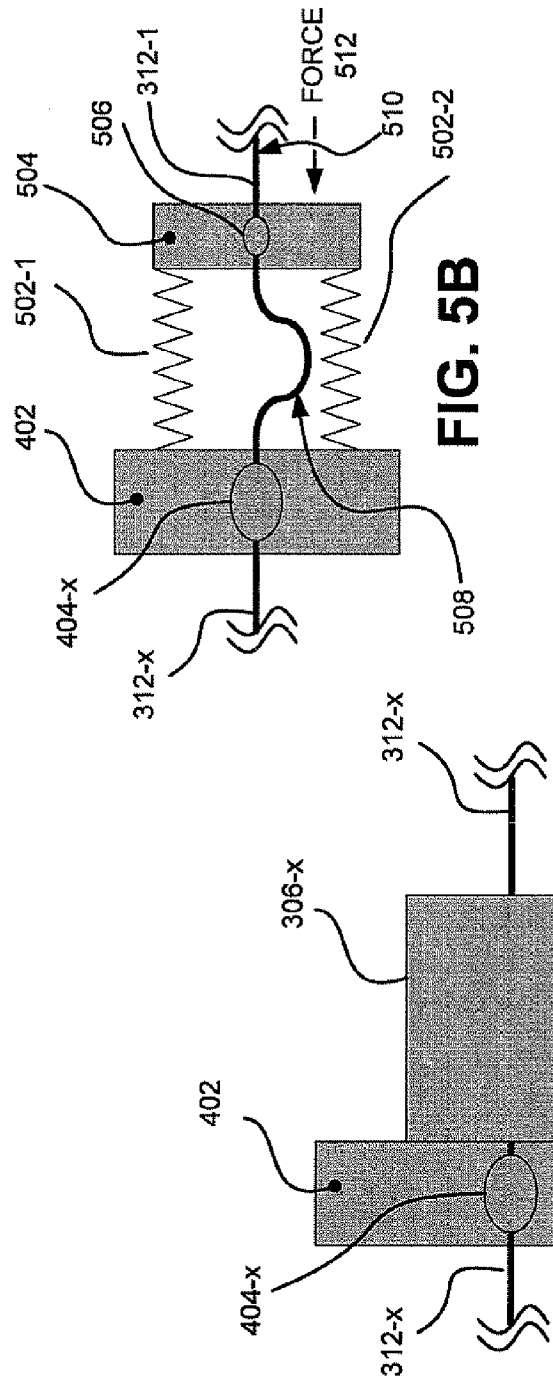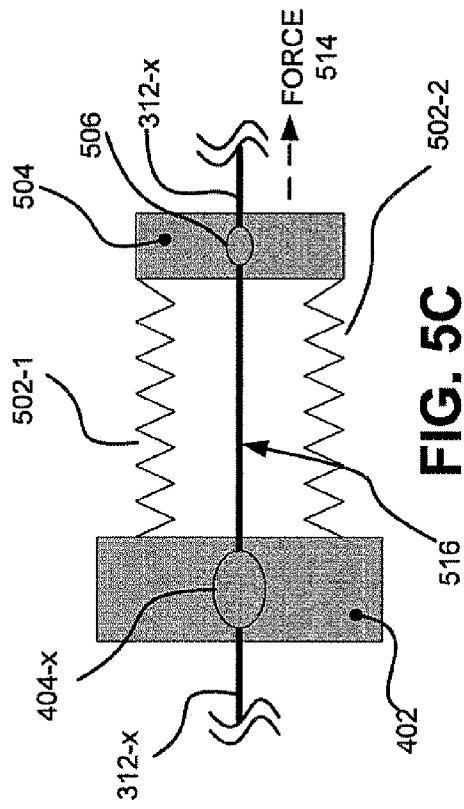
FIG. 5B
FIG. 5C
FIG. 5A
TOP VIEW

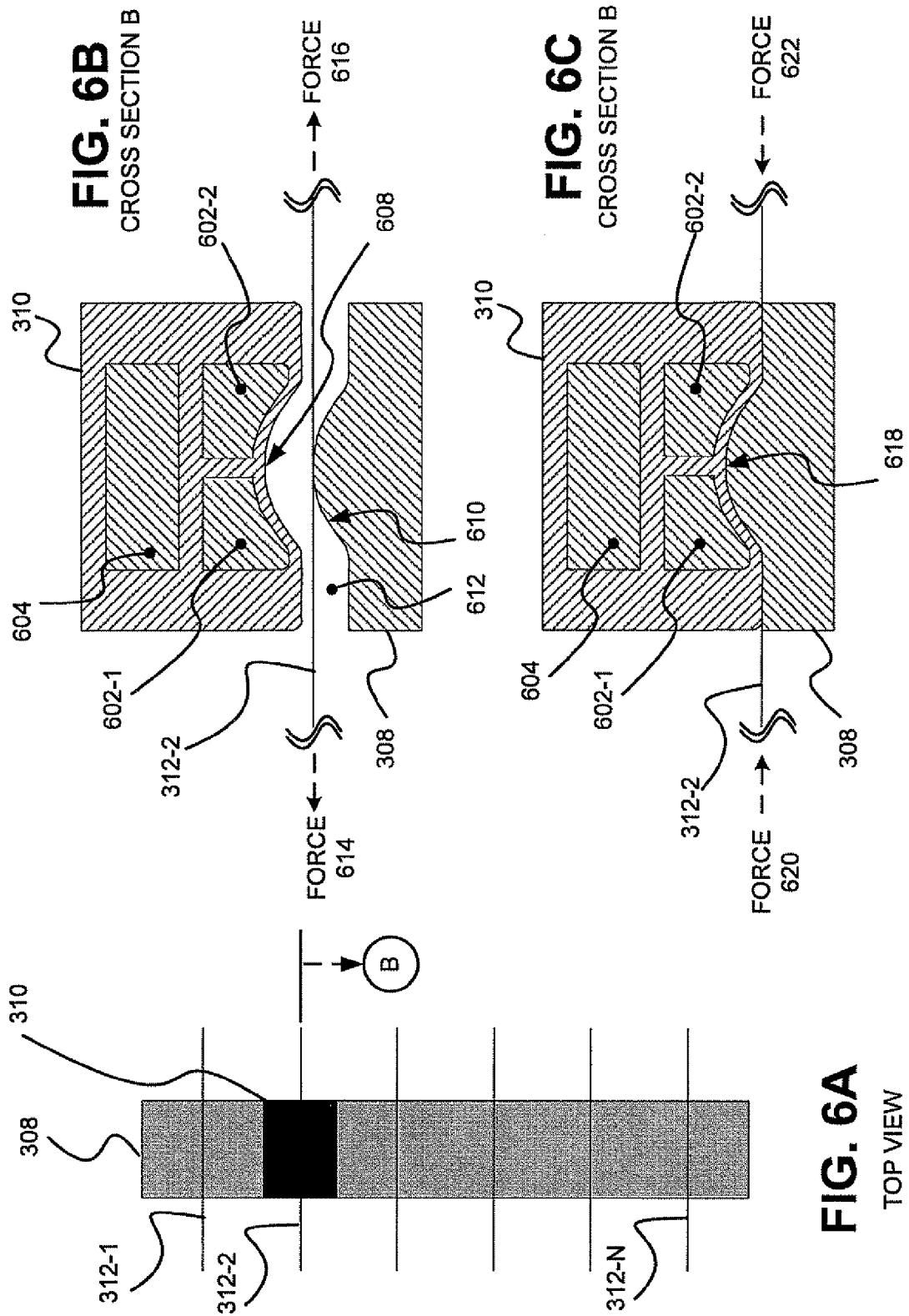

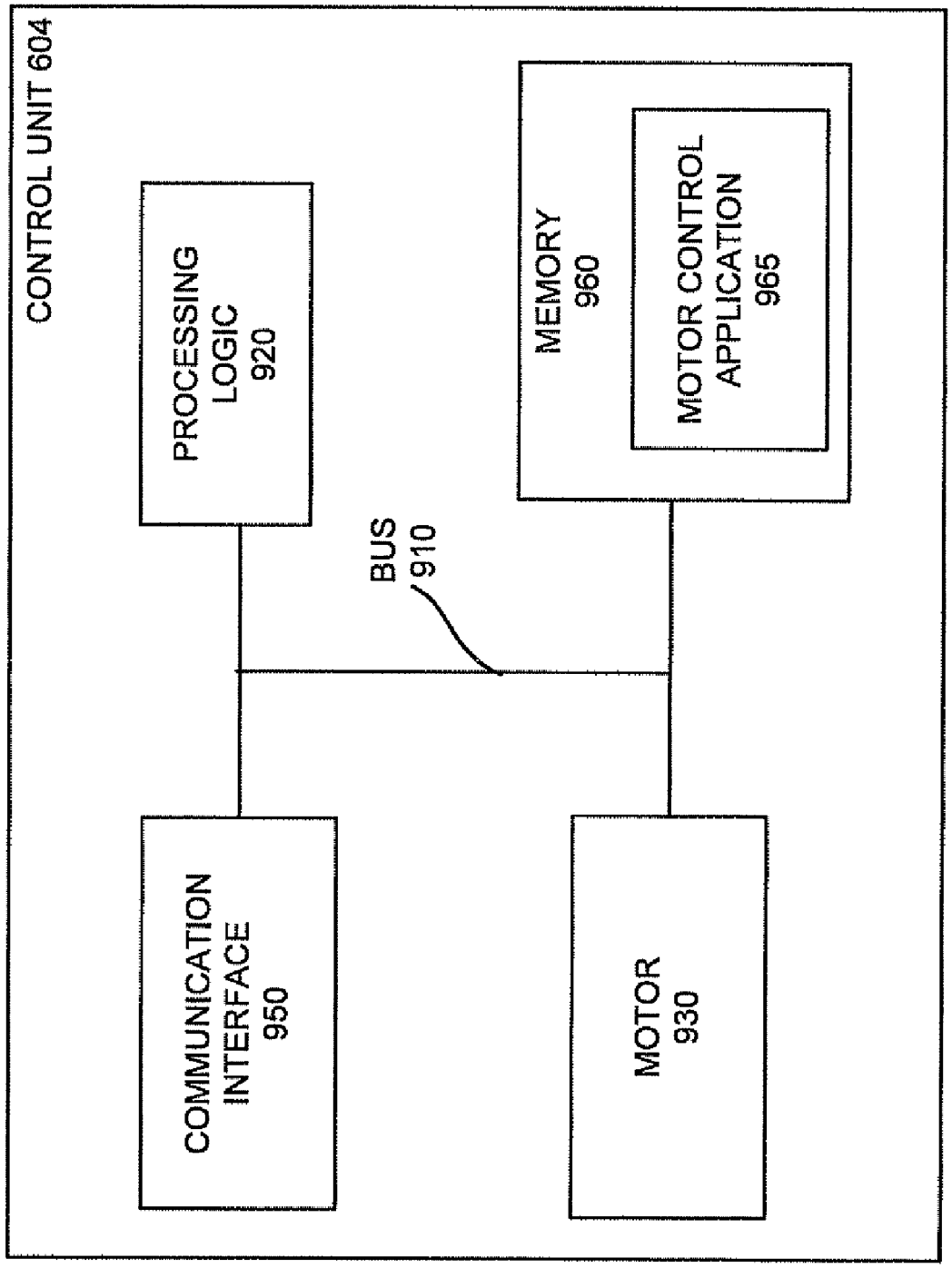

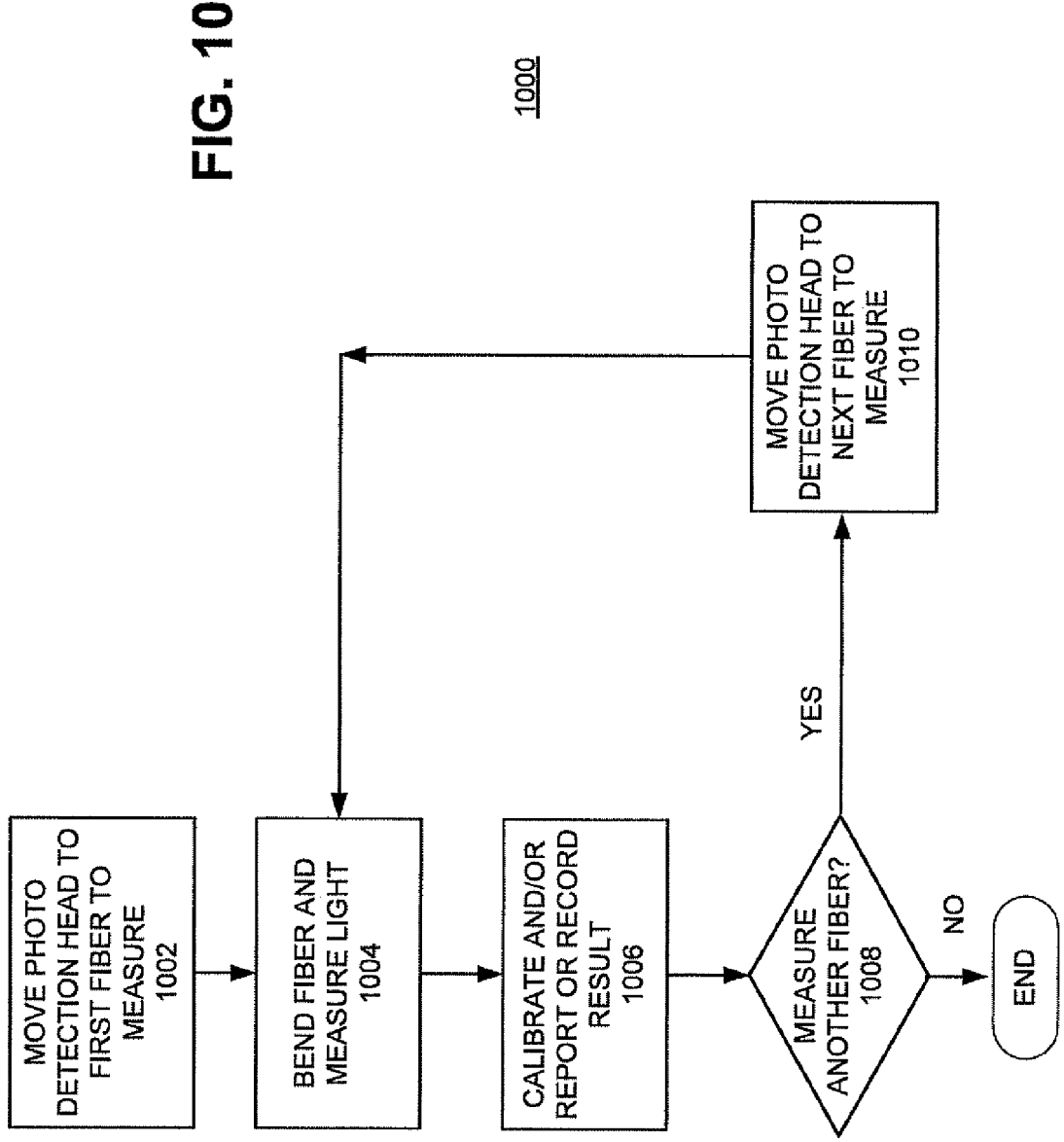

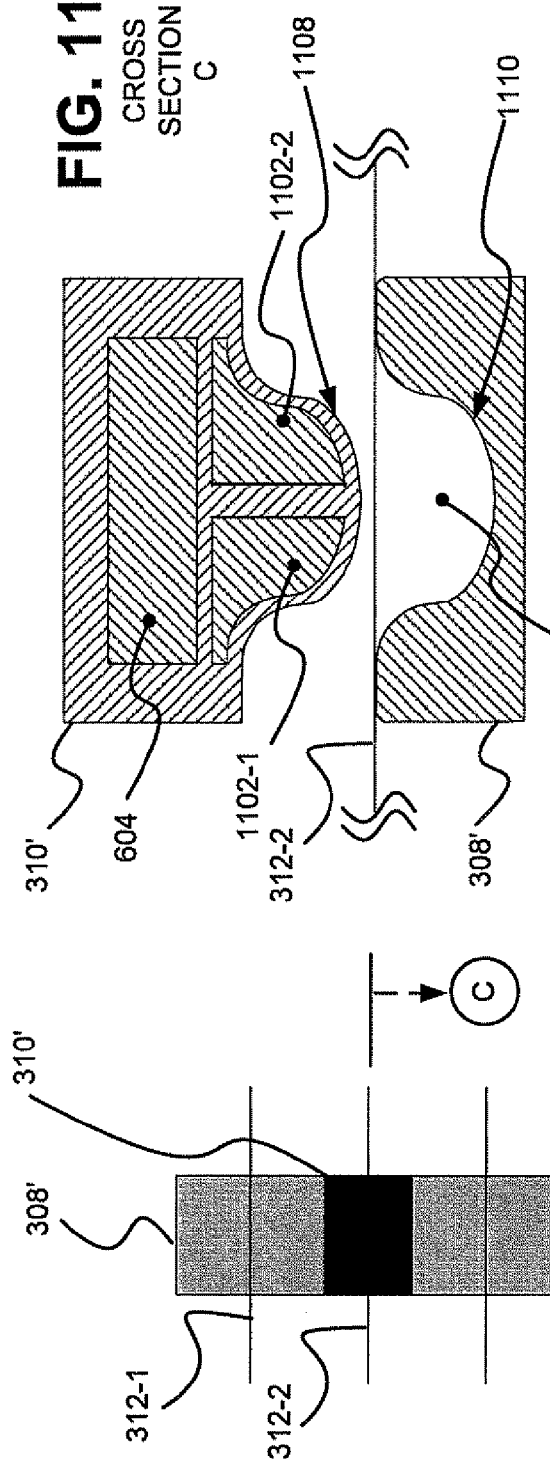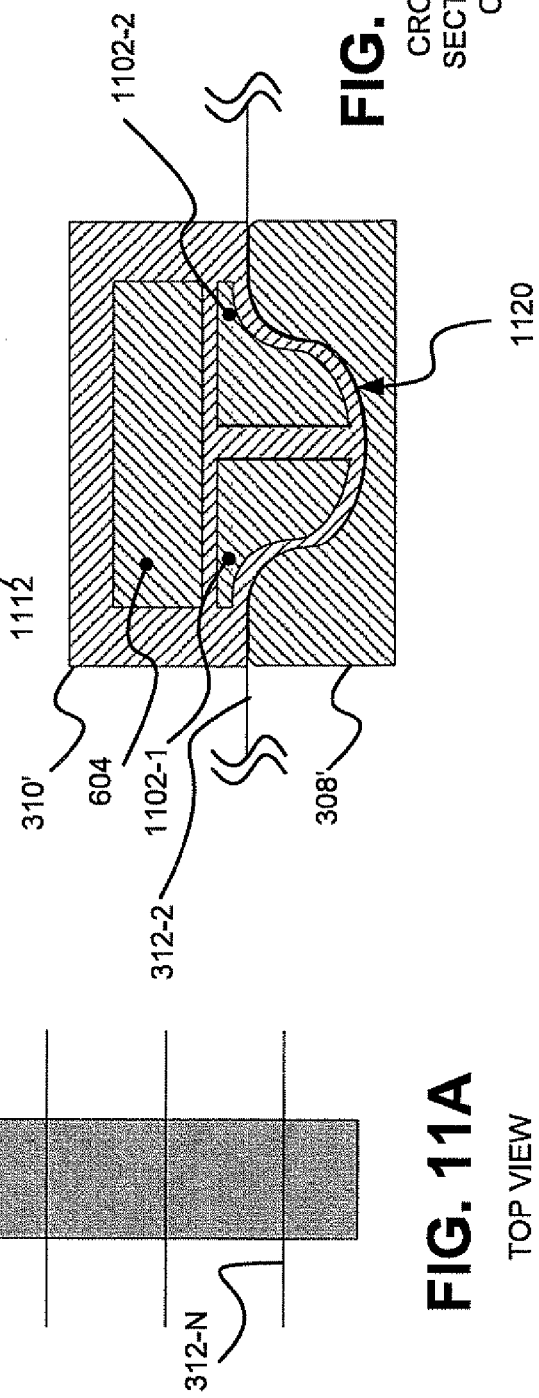

OPTICAL POWER MONITORING WITH ROBOTICALLY MOVED MACRO-BENDING

BACKGROUND INFORMATION

Fiber-optic cables are becoming increasingly prevalent as digital communications expand. Fiber-optic cables may include transoceanic cables that carry international telephone calls and Internet traffic. Fiber-optic cables may also include cables to consumer homes that deliver broad-band internet, television, and/or telephone services.

BRIEF DESCRIPTION OF THE DRAWINGS

FIGS. 4A and 4B are block diagrams of an exemplary fiber fixture to secure optical fibers;

FIGS. 5A, 5B, and 5C are block diagrams of a fiber tension device;

FIGS. 6A, 6B, and 6C are block diagrams of optical fibers, a photo-detector head, and a rail;

FIG. 9 is a block diagram of exemplary components of a control unit;

FIG. 10 is a flow chart for monitoring optical fibers with an optical fiber monitor;

FIGS. 11A, 11B, and 11C are block diagrams of a second exemplary optical fiber monitor;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Figure 1:
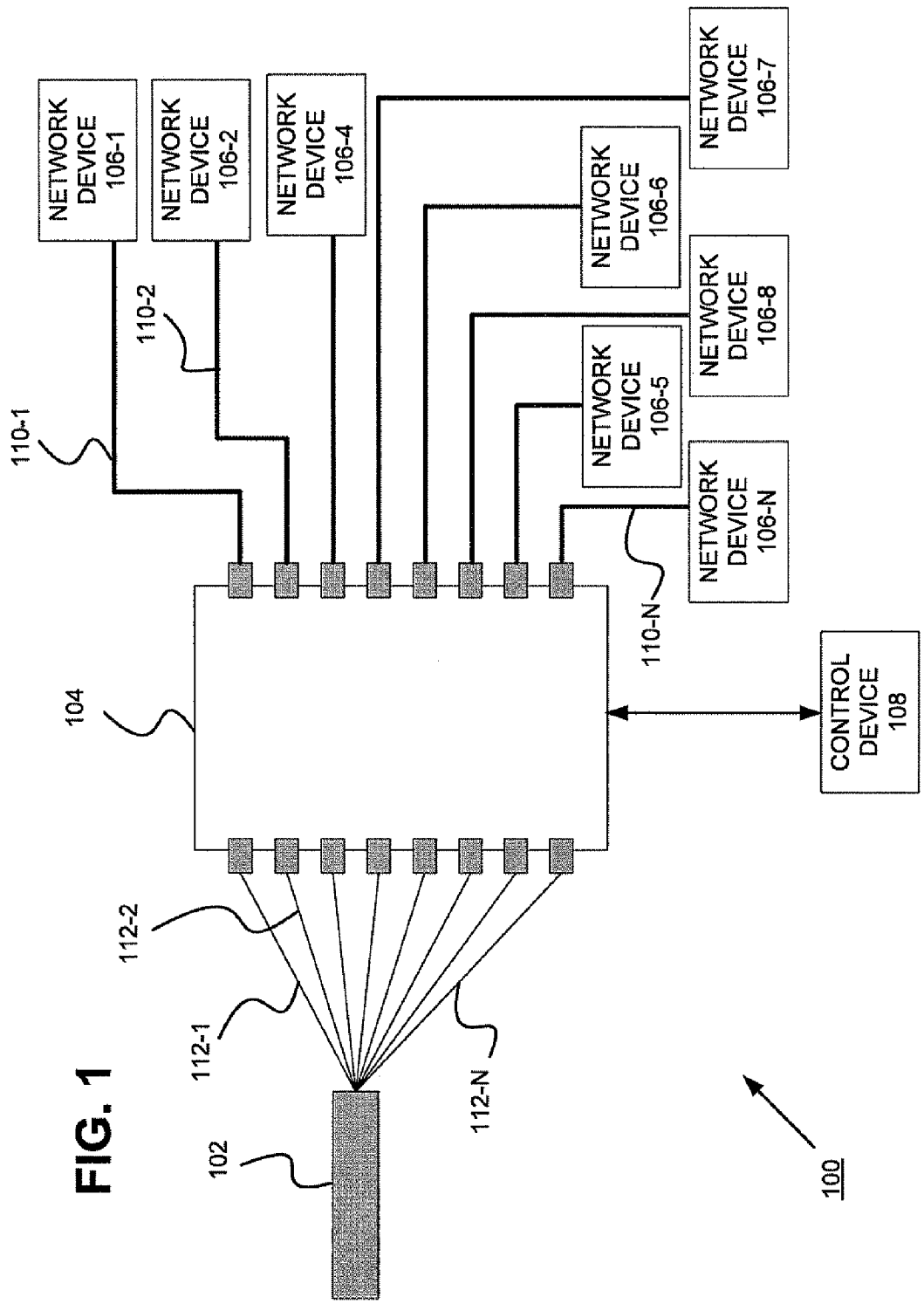
FIG. 1 is a block diagram of an exemplary environment for monitoring optical fibers.

FIG. 1 is a block diagram of an exemplary environment 100 for monitoring optical fibers. Exemplary environment 100 may include a fiber cable 102, an optical fiber monitor 104 ("monitor 104"), network devices 106-1 through 106-N (collectively "network devices 106," individually "network device 106-*x*"), and a control device 108. In practice, there may be more, different, or fewer devices or a different arrangement of devices than what is shown in FIG. 1. Further, while FIG. 1 shows cable 102, monitor 104, and network devices 106 in environment 100, one or more of these devices may be remotely located, e.g., the devices may be geographically diverse.

Fiber cable 102 may include a group of optical fibers 112-1 through 112-N (collectively "fibers 112," individually "fiber 112-*x*") that couple cable 102 with monitor 104. Network devices 106-1 through 106-N may be coupled to monitor 104 through optical fibers 110-1 through 110-N (collectively "fibers 110," individually "fiber 110-*x*"), respectively. Control device 108 may be coupled to monitor 104 directly or through one or more networks.

Fiber cable 102 may be any type of fiber-optic cable. For example, fiber cable 102 may be a trans-oceanic or transcontinental communications cable. Fiber cable 102 may be a cable entering a person's house. Fiber cable 102 may be a cable entering a telecommunication company's central office. Fiber cable 102 may include one or more optical fibers, such as fibers 112.

Monitor 104 may couple fibers 112-1 through 112-N to fibers 110-1 through 100-N, respectively, and may monitor signals passing from fibers 110 to fibers 112 or vice versa. In other words, monitor 104 may sit between cable 102 and network devices 106 to monitor the signals passing between them in one or both directions. Monitor 104 may measure properties of light received from optical fibers 112 or optical fibers 110. For example, monitor 104 may measure the optical power to determine that one or more of fibers 110 or 112 is broken or not passing a strong signal.

Network devices 106 may include routers, switches, or computers, for example. Network devices 106 may include any device capable of receiving and/or transmitting communication signals, such as communication signals carried over fibers 110.

Control device 108 may include a computer that sends or receives signals to or from monitor 104. Control device 108 may receive signals from monitor 104, such as signals reporting the status of optical fibers 112 and/or optical fibers 110. Control device 108 may also send signals to monitor 104 to calibrate monitor 104.

Figure 2:
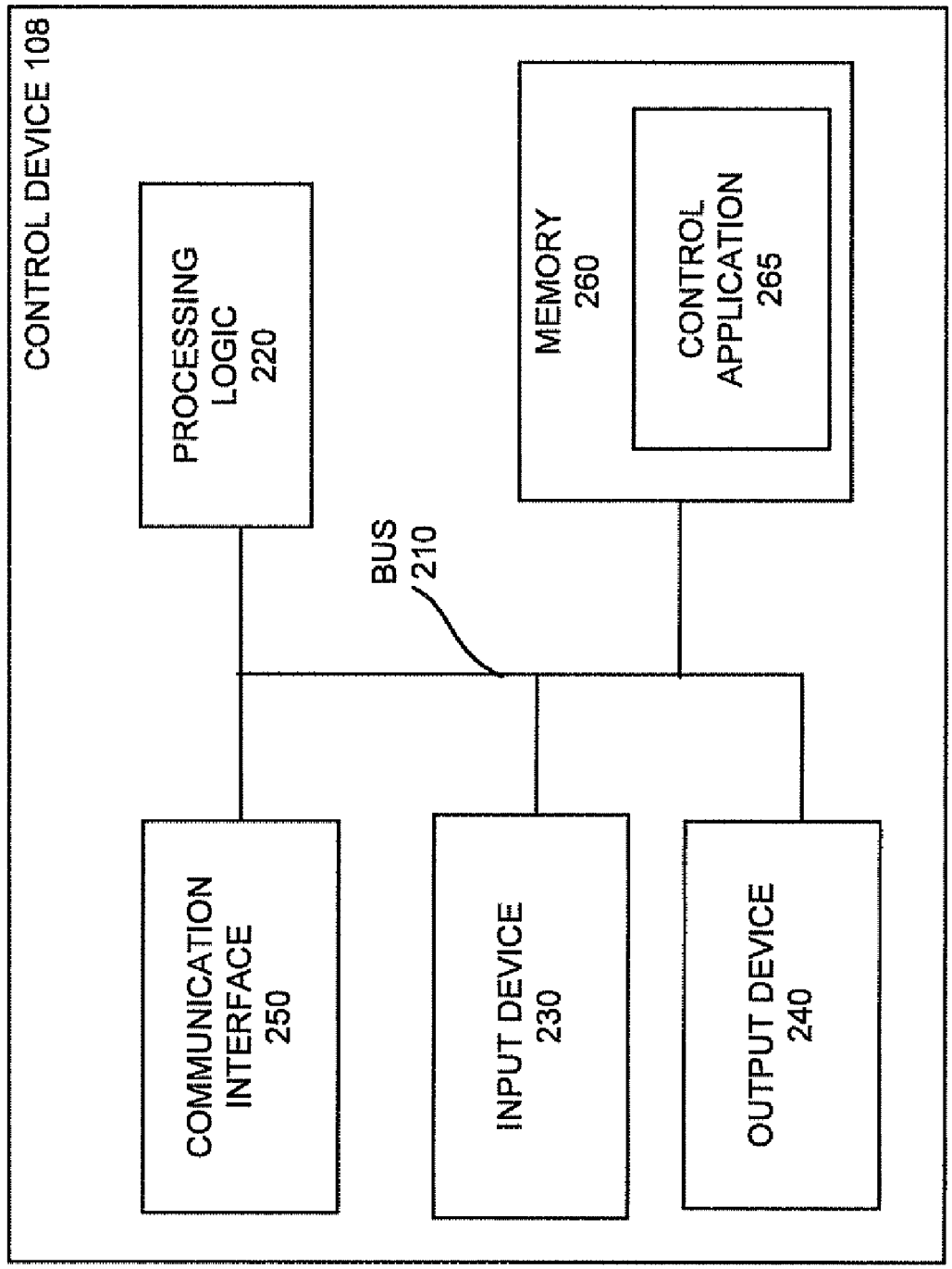
FIG. 2 is a block diagram of exemplary components of a control device.

FIG. 2 is a block diagram of exemplary components of control device 108. Control device 108 may include a bus 210, processing logic 220, an input device 230, an output device 240, a communication interface 250, and a memory 260. Control device 108 may include other components (not shown) that aid in receiving, transmitting, and/or processing data. Moreover, other configurations of components in control device 108 are possible. Further, one or more components of control device 108 may be remotely located.

Bus 210 may include a path that permits communication among the components of control device 108. Processing logic 220 may include any type of processor or microprocessor (or groups of processors or microprocessors) that interprets and executes instructions. In other embodiments, processing logic 220 may include an application-specific integrated circuit ("ASIC"), a field-programmable gate array ("FPGA"), or the like.

Communication interface 250 may include any transceiver-like mechanism that enables control device 108 to communicate with other devices and/or systems. Memory 260 may include a random access memory ("RAM") or another type of dynamic storage device that may store information and instructions for execution by processing logic 220; a read-only memory ("ROM") device or another type of static storage device that may store static information and instructions for use by processing logic 220; and/or some other type of magnetic or optical recording medium and its corresponding drive for storing information and/or instructions. Memory 260 may store a control application 265, for example. Control application 265 may allow control device 108 to control monitor 104 to determine the status of fibers, such as fibers 112 or fibers 110. Control application 265 may calibrate monitor 104. Applications other than a control application 265 are possible.

Input device 250 may include a device that permits a user to input information into control device 108, such as a keyboard, a keypad, a mouse, a pen, a microphone, one or more biometric mechanisms, or the like. Output device 240 may include a device that outputs information to the user, such as a display, a printer, a speaker, etc.

Control device 108 may perform certain operations, as described in detail below. Control device 108 may perform these operations in response to processing logic 220 executing software instructions contained in a computer-readable medium, such as memory 260. A computer-readable medium may be defined as a physical or logical memory device and/or carrier wave. The software instructions may be read into memory 260 from another computer-readable medium or from another device via communication interface 250. The software instructions contained in memory 260 may cause processing logic 220 to perform processes that are described below.

Figure 3:
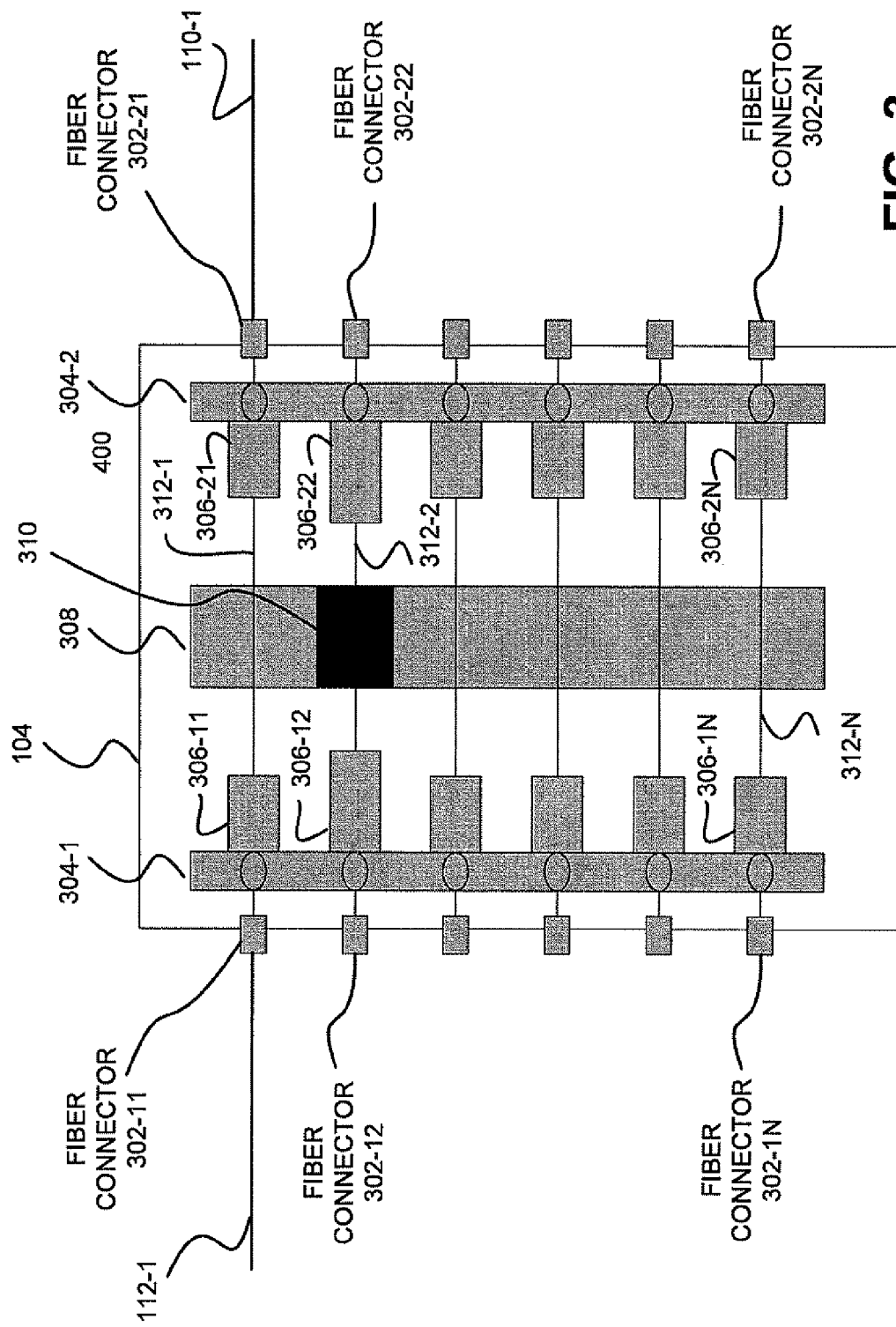
FIG. 3 is a block diagram of an exemplary optical fiber monitor.

FIG. 3 is a block diagram of an exemplary optical fiber monitor 104. Monitor 104 may include a first group of fiber connectors 302-11 through 302-1N and a second group of fiber optic connectors 302-21 through 302-2N (collectively "connectors 302," individually "connector 302-x"), a first fiber fixture 304-1 and a second fiber fixture 304-2 (collectively "fixtures 304," individually "fixture 304-x"), a first group of fiber tension devices 306-11 through 306-1N and a second group of fiber tension devices 306-21 through 306-2N (collectively "tension devices 306," individually "tension device 306-x"), a fiber rail 308 ("rail 308"), a photo-detector head 310 ("head 310"), and a group of optical fibers 312-1 through 312-N (collectively "fibers 312," individually "fibers 312-x").

Fiber connectors 302 may optically couple fibers 112 and fibers 110 to monitor 104. For example, as shown in FIG. 3, fiber connector 302-11 may optically couple fiber 112-1 to monitor 104. Connector 302-21 may optically couple fiber 110-1 to monitor 104. Fibers 312 may optically couple fibers 110 with fibers 112 through monitor 104. For example, fiber 312-1 may optically couple fiber 112-1 and fiber 110-1.

Fiber fixtures 304 may secure fibers 312 to limit motion of fibers 312 within monitor 104. Fiber tension devices 306 may control the tension of fibers 312 between fiber fixtures 304. For example, fiber fixture 306-12 and fiber fixture 306-22 may control the tension of fiber 312-2 between fixture 304-1 and fixture 304-2. Fiber rail 308 may hold fibers 312 for measurement by head 310.

FIG. 4A is a block diagram of a top view of exemplary fiber fixture 304-x to secure fibers 312. Fiber fixture 304-x may include a fixture rail 402 and glue spots 404-1 through 404-N (collectively "glue spots 404," individually "glue spot 404-x"). Glue spots 404 may secure fibers 312 to fixture rail 402. For example, glue spot 404-2 may hold fiber 312-2 to fixture rail 402.

FIG. 4B is a block diagram of a cross-sectional view of exemplary fiber fixture 304-x to secure fibers 312. The cross-sectional view in FIG. 4B is defined by the arrow labeled A in FIG. 4A. FIG. 4B depicts fiber 312-2 bound to fixture rail 402 with glue spot 404-2. All fibers 312 may be similarly attached to rail 402.

FIG. 5A is a block diagram of fiber tension device 306-x and a portion of fiber fixture 304-x. The portion of fiber fixture 304-x may include fiber fixture rail 402 and glue spot 404-x. Optical fiber 312-x may pass over fiber rail 402 under glue spot 404-x and through fiber tension device 306-x.

FIGS. 5B and 5C are block diagrams of exemplary internal components of fiber tension device 306-x. Fiber tension device 306-x may include a first spring 502-1 and a second spring 502-2 (collectively "springs 502"), a dynamic fiber holder 504, and a glue spot 506. Springs 502 may attach to fixture rail 402 on one end and may attach to dynamic fiber holder 504 on the other end. Glue spot 506 may hold optical fiber 312-x to dynamic fiber holder 504 similarly to how glue spot 404-x may hold fiber 312-x to fiber fixture rail 402, as described in FIG. 4B. As shown in FIG. 5B, springs 502 may apply a force 512 on dynamic fiber holder 504 in the direction of fixture rail 402. As shown in FIG. 5B, optic cable 312-x may have slack, as shown at portion 508. Further, as shown in FIG. 5B, fiber 312-x may be pulled taught at portion 510, e.g., fiber 312-x may be "straight" at portion 510.

As shown in FIG. 5C, a force 514 in the direction away from fixture rail 402 may move dynamic fiber holder 504 and may stretch springs 502. When springs 502 are stretched, optical fiber 312-x may become taught, e.g., straight, at portion 516. Force 514 may result, for example, when optical fiber 312-x (attached to dynamic fixture 504) is pulled at portion 510 away from fiber fixture rail 402. When force 514 is removed, springs 502 may return to the position as shown in FIG. 5B and fiber 312-x may once again have slack at portion 508 and be taught at portion 510.

FIG. 6A is a block diagram of rail 308, optical fibers 312, and photo-detector head 310. In the exemplary embodiment of FIG. 6A, optical fibers 312 may be above rail 308 and photo-detector head 310 may be placed above fibers 312 such that one of fibers 312 passes between rail 308 and head 310.

FIG. 6B is a block diagram of a cross section of an exemplary photo-detector head 310 and rail 308. The cross-sectional view in FIG. 6B is defined by the arrow labeled B in FIG. 6A. Head 310 may include a first photo detector 602-1 and a second photo detector 602-2 (collectively "photo detectors 602") and a control unit 604.

Head 310 may include a concave portion 608. Rail 308 may include a convex portion 610 that matches concave portion 608. As shown in FIG. 6B, there may be a gap 612 between head 310 and rail 308 for passage of fiber 312-2. In the exemplary embodiment, fiber 312-2 may be taught, e.g., straight, in gap 612 because of a force 614 and a force 616 exerted on fiber 312-2. Force 614 and force 616 may be applied, for example, by tension device 306-21 and 306-22 as discussed above with respect to FIGS. 5B and 5C, e.g., forces 614 and 616 may correspond to force 512 in FIG. 5B. In other words, tension devices 306 may provide tension for fiber 312-2. Fiber 312-2 may rest at the zenith of convex portion 610.

As shown in FIG. 6C, head 310 and/or rail 308 may be moved so as to reduce gap 612 and bend fiber 312-2. When fiber 312-2 is bent, a percentage of light may "leak" out of fiber 312-2, a technique known as "macro-bending." In the exemplary embodiment of FIG. 6C, gap 612 has been reduced to the width of optic cable 312-2 as shown at portion 618. Concave portion 608 and convex portion 610 may be formed as to assist macro-bending and the leakage of light. Photo detectors 602 may detect the light leaking from fiber 312-2. Photo-detector 602-1 may detect light leakage in one direction and photo-detector 602-2 may detect light leakage in the opposite direction. The bending of fiber 312-2 may not physically harm fiber 312-2 so that fiber 312-2 may return to the shape shown in FIG. 6B without damage. The shapes of rail 308 and head 310 may generate macro-bending on fiber 312 without damaging fibers 312. Photo-detectors 602 may be shaped to conform to concave portion 608.

When head 310 and/or rail 308 are moved to reduce gap 612, they may exert a force 620 and a force 622 on fiber 312-2. Forces 620 and 622 may pull on tension device 306-12 and tension device 306-22, for example, as discussed above with respect to FIG. 5C. Forces 620 and 622 may correspond to force 514 in FIG. 5C. In other words, tension devices 306 may provide the slack for fiber 312-2 to bend during macro-bending. In one embodiment, there may be grooves (not shown) on rail 308 or on head 310 to maintain fiber 312-x in a known position during measurement.

Figure 7B:
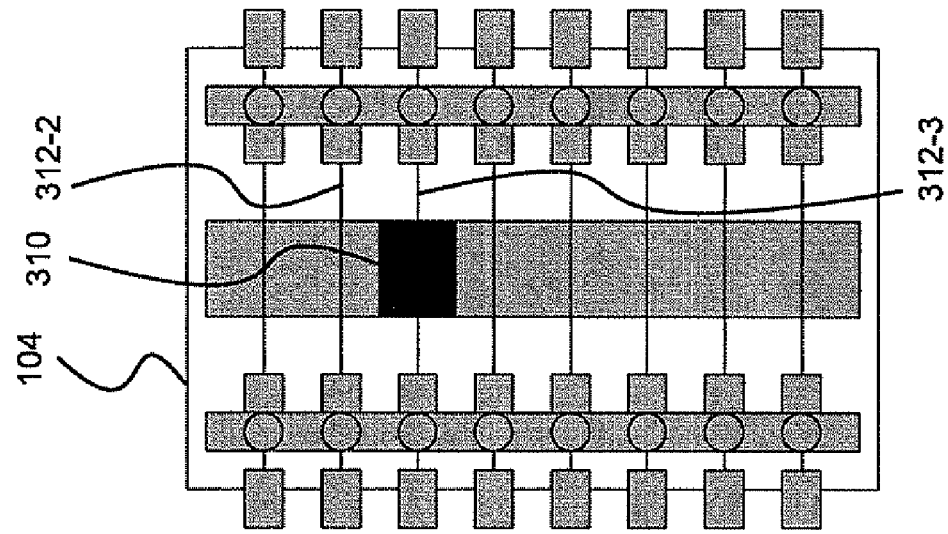
FIGS. 7A and 7B are block diagrams of a fiber optic monitor with a photo-detector head in different positions.
Figure 7A:
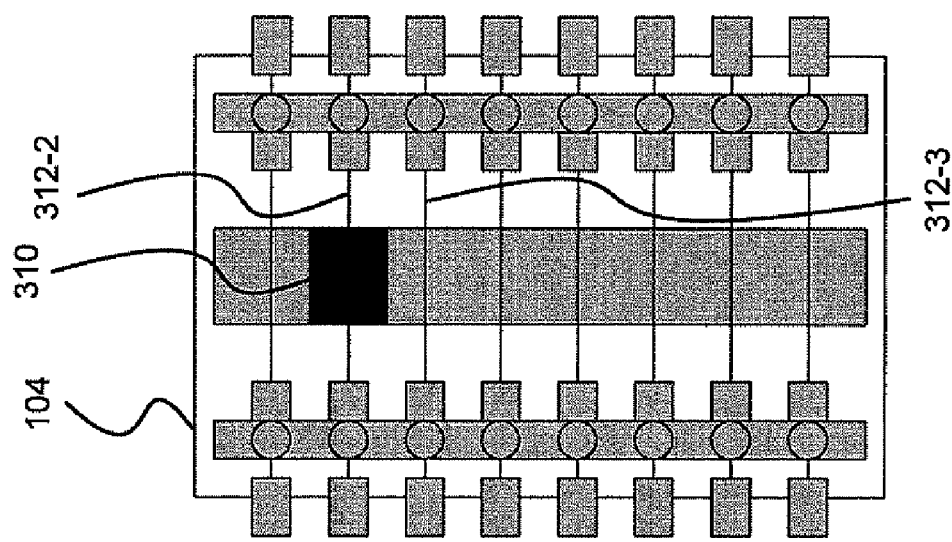

Control unit 604 may include a motor that may move head 310 along a path from one fiber 312-x to another fiber 312-x. For example, FIG. 7A is a block diagram of monitor 104 with head 310 above optic cable 312-2. FIG. 7B is a block diagram of monitor 104 with head 310 above optic cable 312-3. Head 310 may be moved to any one of fibers 312, for example. In addition, the motor in control unit 604 may also move head 310 in relation to rail 308 to reduce gap 612 and to bend fibers 312. When the motor in control unit 604 moves head 310, such movement may be considered "robotically moving," e.g., movement other than with a human hand.

Figure 8:
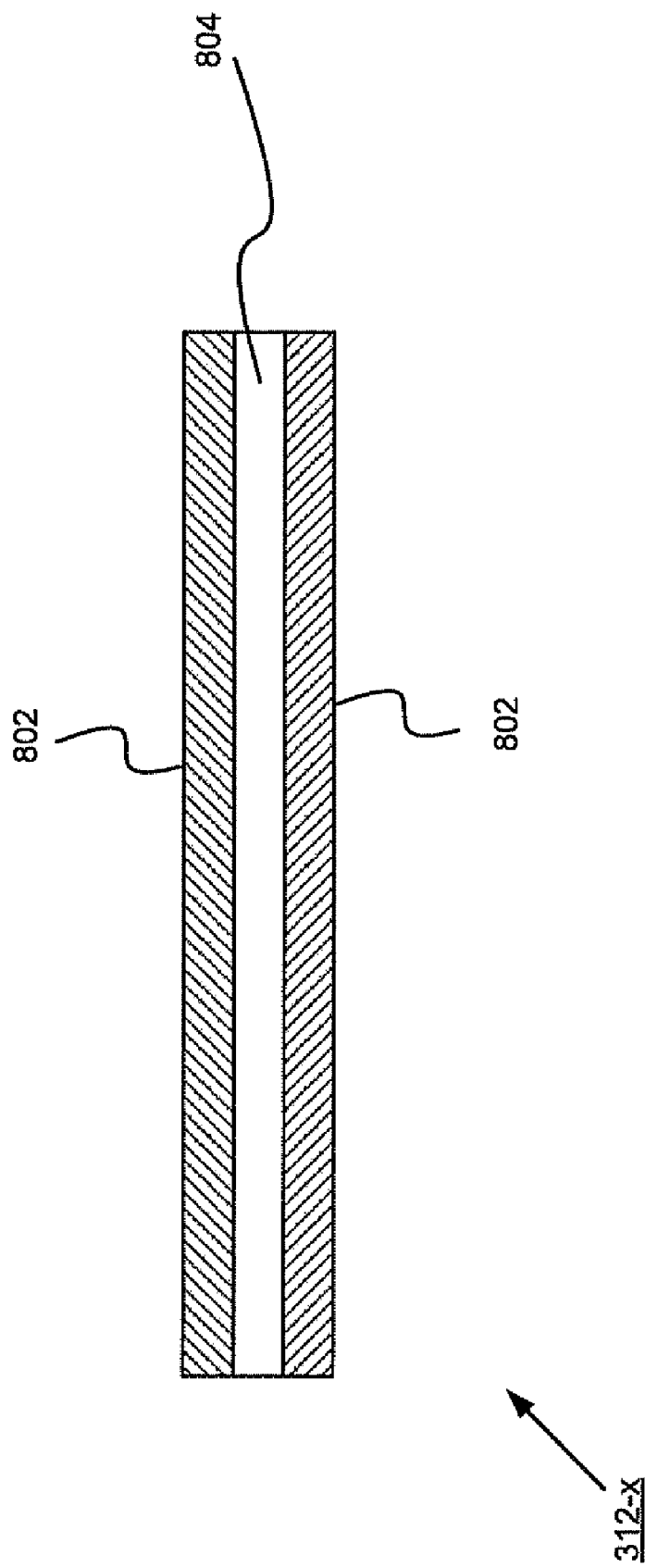
FIG. 8 is a diagram of an exemplary optical fiber.

FIG. 8 is a diagram of exemplary optical fiber 312-x. Optical fiber 312-x may include a jacket 802 and a transmission medium 804. Jacket 802 may be formed from a material that can withstand multiple macro-bending events without damage. Jacket 802 may have a thickness to facilitate accurate positioning of optic cable 312-x with respect to head 310 and rail 308 for accurate measurement of leaked light. Jacket 802 may be highly transparent to the wavelengths of light used in transmission medium 804 for communications. High transparency of jacket 802 may result in a greater percentage of leaked light reaching photo-detectors 602. Thus, a high transparency jacket 802 may allow for less light leakage from macro-bending in order to obtain an accurate measurement.

FIG. 9 is a block diagram of exemplary components of control unit 604. Control unit 604 may include a bus 910, processing logic 920, a motor 930, a communication interface 950, and a memory 960. Control unit 604 may include other components (not shown) that aid in receiving, transmitting, and/or processing data. Moreover, other configurations of components in control unit 604 are possible. For example, one or more components of control unit 604 may be remotely located.

Bus 910 may include a path that permits communication among the components of control unit 604. Processing logic 920 may include any type of processor or microprocessor (or groups of processors or microprocessors) that interprets and executes instructions. In other embodiments, processing logic 920 may include an ASIC, FPGA, or the like.

Communication interface 950 may include any transceiver-like mechanism that enables control unit 604 to communicate with other devices and/or systems. Memory 960 may include a RAM or another type of dynamic storage device that may store information and instructions for execution by processing logic 920; a ROM or another type of static storage device that may store static information and instructions for use by processing logic 920; and/or some other type of magnetic or optical recording medium and its corresponding drive for storing information and/or instructions. Memory 960 may store a control application 965, for example. Control application 965 may allow control device 108 to control monitor 104 in order to determine the status of fiber cables, such as fibers 112 or fibers 110. Control application 965 may also calibrate monitor 104. Applications other than a control application 965 are possible.

Motor 930 may include a rotor, a stator, a hub, and other components that may form a motor. Motor 930 may be a linear motor. Motor 930 may move head 310 along rail 308 such that photo detectors 602 may detect light leaked from fibers 312. Motor 930 may also move head 310 and/or rail 308 to reduce gap 612.

Control unit 604 may perform certain operations, as described in detail below. Control unit 604 may perform these operations in response to processing logic 920 executing software instructions contained in a computer-readable medium, such as memory 960. The software instructions may be read into memory 960 from another computer-readable medium or from another device via communication interface 950. The software instructions contained in memory 960 may cause processing logic 920 to perform processes that are described below.

FIG. 10 is a flow chart of an exemplary process 1000 for monitoring optical fibers in an optical fiber monitor, such as monitor 104. Process 1000 may begin by moving a photo-detector head to a first fiber for measuring leaked light (block 1002). For example, head 310 may be moved over fiber 312-2 as shown in FIGS. 7A and 6B. The optical fiber may be bent, e.g., macro-bent, and light may be measured (block 1004). For example, head 310 and rail 308 may reduce gap 612 between the two and may bend fiber 312-2 as shown in FIG. 6B, and photo-detectors 602 may measure light leaked from fiber 312-2. The measured light may be reported and/or recorded or optical fiber monitoring device 104 may be calibrated (block 1006). For example, control unit 604 may report the measured light to control device 108. The power of the light leaked from optic cable 312-2 may be proportional to the total light power passing through optic cable 312-2. Therefore, if the proportion of leaked power to total power, e.g., the percentage of leaked power, is known, it may be possible to determine (e.g., calculate) an unknown power of light passing through optic cable 312-2 by measuring the leaked power. The process of obtaining the relationship, e.g., the proportion, of leaked power to total power may be referred to as "calibration." Monitor 104 may be calibrated by passing a known power of light through fibers 312 and measuring the leaked light with photo-detectors 602, for example. The relationship may be determined between the known power of light passed through fibers 312 and the measured leaked light.

Calibration may take place on fibers 312 when fibers 312 are located in monitor 104. Alternatively, calibration may take place on fibers 312 before fibers 312 are placed in monitor 104 during assembly of monitor 104. Calibration may also take place on a fiber substantially similar to fibers 312.

If there is another fiber to be measured (block 1008:YES), the photo-detector head may be moved to the next fiber to measure and process 1000 may repeat. For example, control unit 604 may move head 310 to fiber 312-2 as shown in FIG. 7B. If there are no other fibers to measure (block 1008:NO), process 1000 may end.

FIGS. 11A, 11B, and 11C are block diagrams of another exemplary optical fiber monitor 104. FIG. 11A is a block diagram of a rail 308', fibers 312, and a photo-detector head 310' ("head 310'"). In the exemplary embodiment of FIG. 11A, fibers 312 may be placed above rail 308' and head 310' may be placed above a fiber (shown above fiber 312-2 in FIG. 11A). FIGS. 11B and 11C are block diagrams of the cross section of photo-detector head 310' and rail 308'. The cross-sectional view is defined by the arrow labeled C in FIG. 11A. Head 310' may include a first photo detector 1102-1 and a second photo detector 1102-2 (collectively "photo detectors 1102") and a control unit 604.

Head 310' may include a convex portion 1108. Rail 308' may include a concave portion 1110 that matches convex portion 1108. As shown in FIG. 11B, there may be a gap 1112 between head 310' and rail 308' for passage of fiber 312-2. In the exemplary embodiment, fiber 312-2 may be taught, e.g., straight, in gap 1112 because of forces exerted by tension devices, such as tension device 306-12 and tension device 306-22. Fiber 312-2 may rest at two points of contact on rail 308' toward the ends of concave portion 1110.

As shown in FIG. 11C, head 310' and/or rail 308' may be moved so as to reduce gap 1112 and bend fiber 312-2. As discussed above, when fiber 312-2 bends, light may leak out of fiber 312-2. In the exemplary embodiment FIG. 11C, gap 1112 has been reduce to the width of optic cable 312-2 as shown at point 1120.

Photo detectors 1102 may detect the light leaking from fiber 312-2. Photo-detector 1102-1 may detect light leakage in one direction and photo-detector 1102-2 may detect light leakage in the opposite direction.

When head 310' and/or rail 308' are moved to reduce gap 1112, a force may be exerted on fiber 312-2, pulling on tension device 306-12 and tension device 306-22. In one embodiment, there may be grooves (not shown) on rail 308 or on head 310 to maintain fiber 312-*x* in a known position during measurement.

Figure 12:
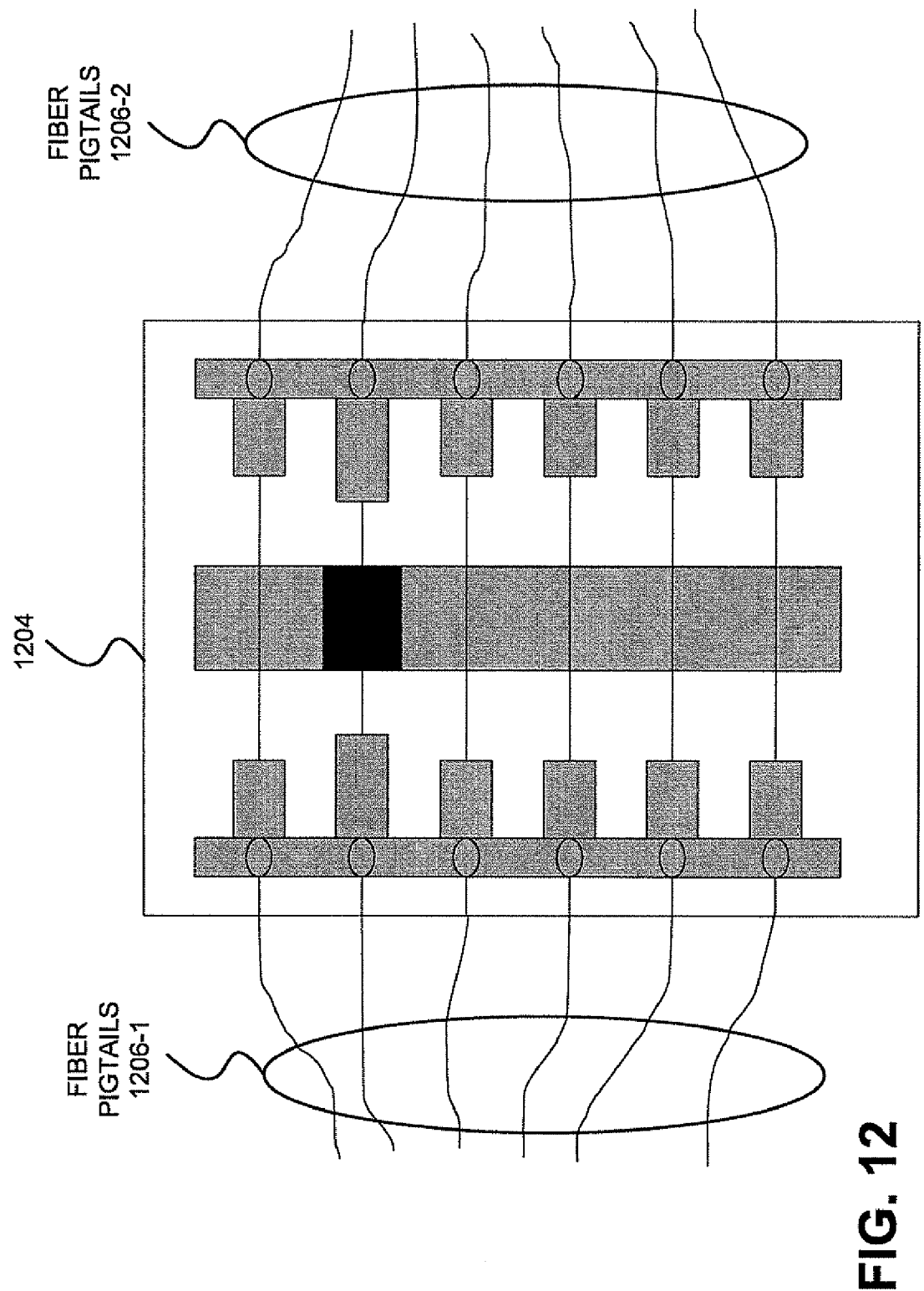
FIG. 12 is a block diagram of an exemplary optical fiber monitor in one embodiment.

FIG. 12 is a block diagram of an exemplary optical fiber monitor 1204 in one embodiment. Monitor 1204 may not include fiber connectors 302 as shown in FIG. 3. Integrated fiber monitor 1204 may include a first group of fiber pigtails 1206-1 and a second group of optical fiber pigtails 1206-2 (collectively "fiber pigtails 1206"). Fiber pigtails 1206 may be spliced into other optical components, avoiding losses due to optical connectors, such as connectors 302.

Figure 13:
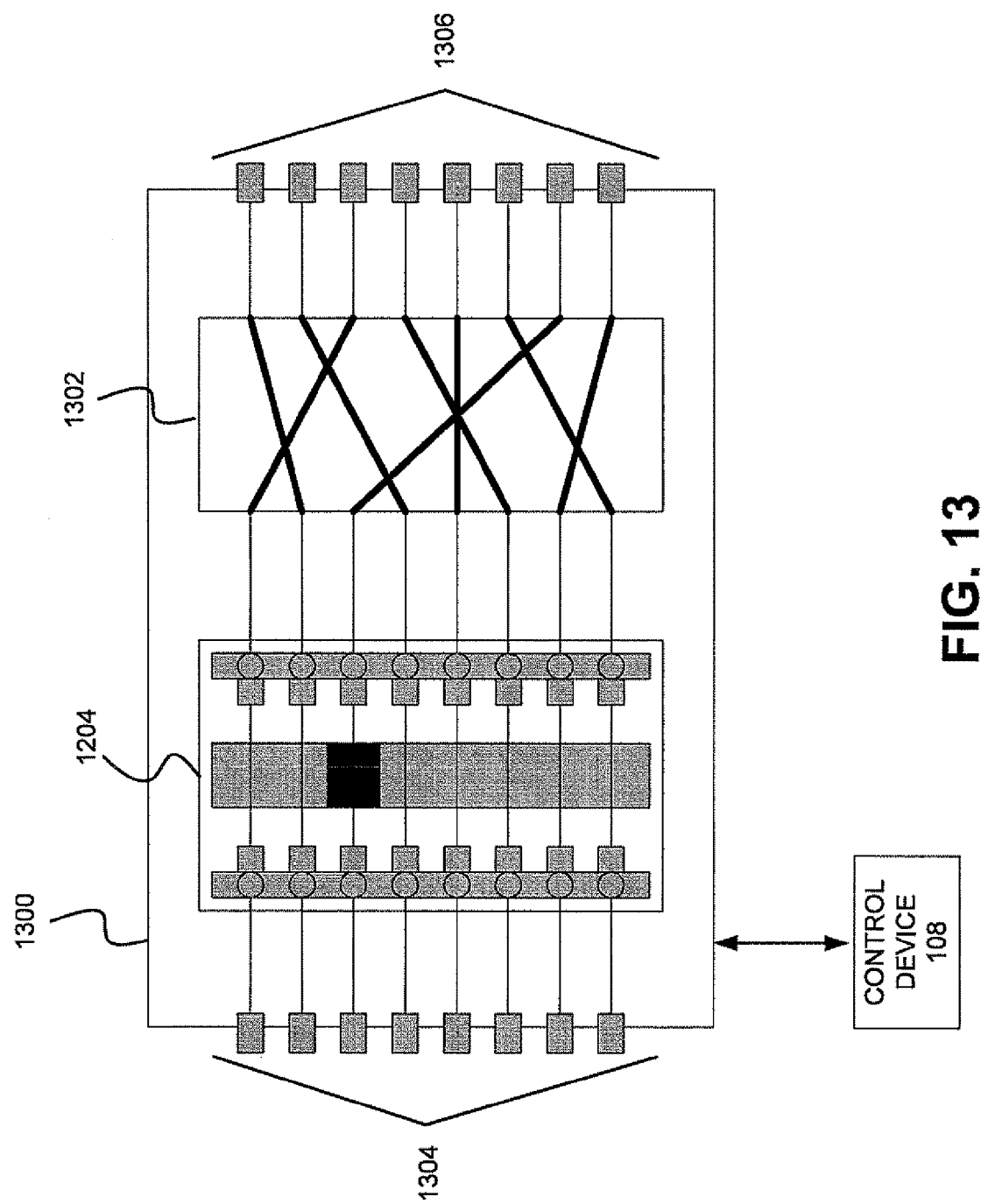
FIG. 13 is a block diagram of an exemplary optical switch including an integrated optical fiber monitor.

FIG. 13 is a block diagram of an exemplary optical switch 1300 including integrated optical fiber monitor 1204. Optical switch 1300 may also include an integrated optical switch 1302 coupled to integrated monitor 1204, a first group of fiber connectors 1304, and a second group of fiber connectors 1306. Optical switch 1300 may switch inputs from optical connectors 1304 to outputs on connectors 1306. Optical switch 1300 may also switch inputs from connectors 1306 to outputs on connectors 1304. Optical switch 1300 may be coupled to control device 108, for example. Control device 108 may calibrate integrated monitor 1204, may receive status information regarding optical signals passing through integrated monitor 1204, and may control integrated monitor 1204.

Figure 14:
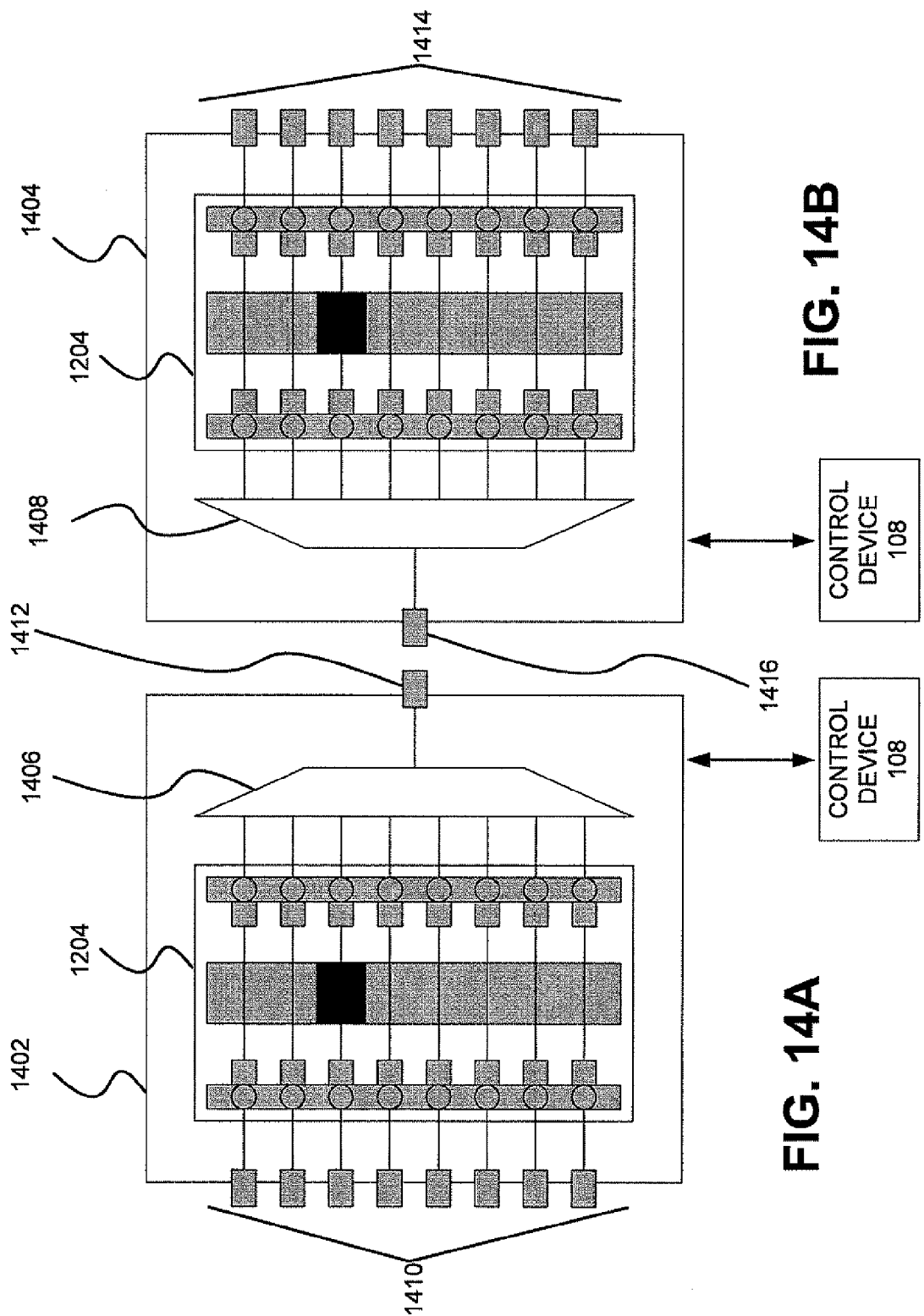
FIGS. 14A and 14B are block diagrams of an exemplary optical multiplexer and an exemplary optical demultiplexer including an integrated optical fiber monitor.

FIGS. 14A and 14B are block diagrams of an exemplary optical multiplexer 1402 and an exemplary optical demultiplexer 1404, respectively, each including integrated fiber monitor 1204. Multiplexer 1402 may also include an integrated optical multiplexer 1406, a group of input optical fiber connectors 1410, and an output fiber connector 1412. Multiplexer 1402 may receive signals on connectors 1410 and may multiplex the signals for outputting on output connector 1412. Optical multiplexer 1402 may be coupled to control device 108. Control device 108 may calibrate integrated monitor 1204, may receive status information regarding optical signals passing through integrated monitor 1204, and may control integrated monitor 1204.

In addition to integrated monitor 1204, demultiplexer 1404 may include an integrated optical demultiplexer 1408, a group of output optical fiber connectors 1414, and an input fiber connector 1416. Demultiplexer 1402 may receive a signal on fiber connector 1416 and may demultiplex the signal for outputting on connectors 1414. Demultiplexer 1404 may be coupled to control device 108. Control device 108 may calibrate integrated monitor 1204, may receive status information regarding optical signals passing through integrated monitor 1204, and may control integrated monitor 1204.

Figure 15:
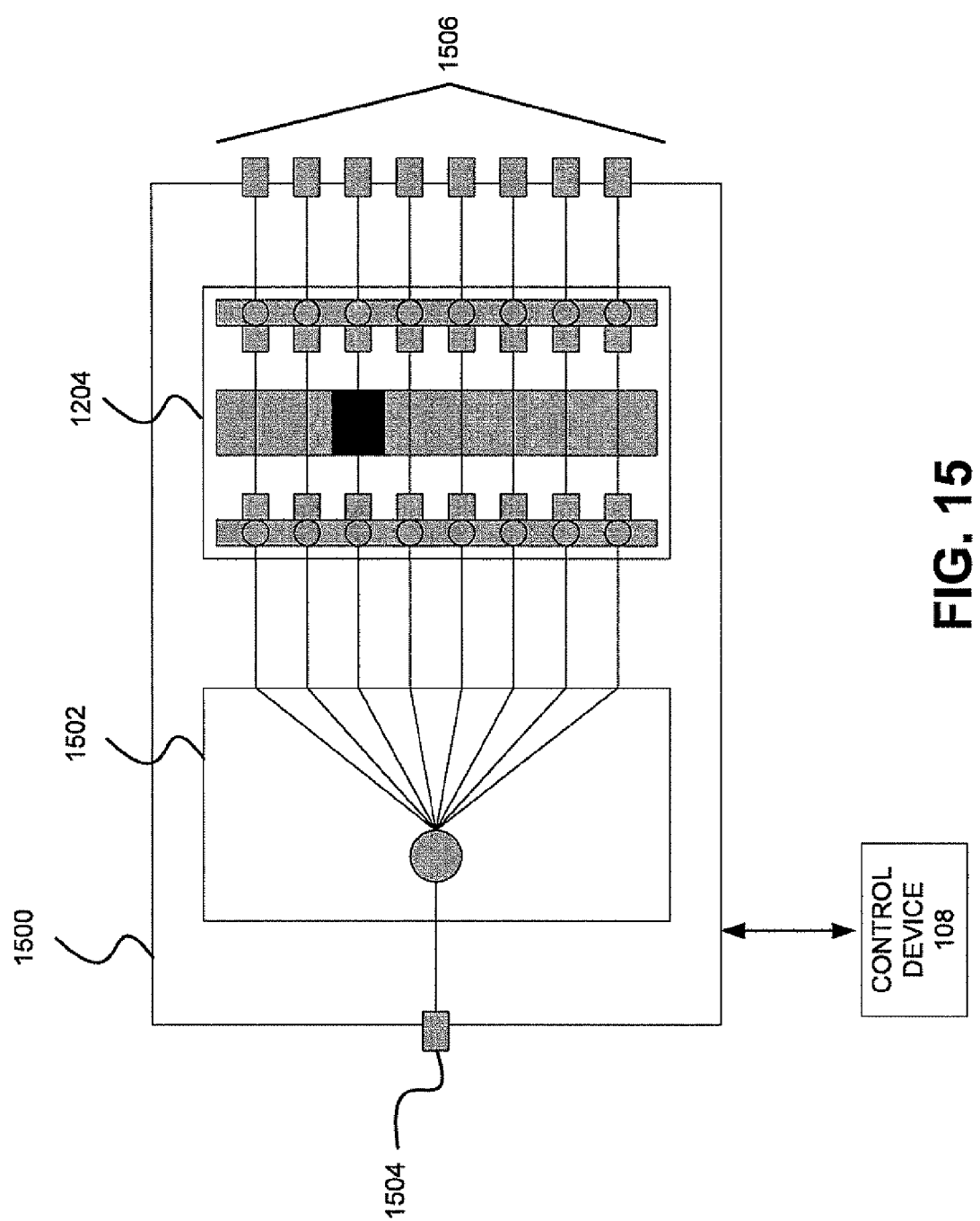
FIG. 15 is a block diagram of an exemplary optical power splitter including an integrated fiber monitor.

FIG. 15 is a block diagram of an exemplary optical power splitter 1500 including integrated fiber monitor 1204. Optical power splitter 1500 may also include an integrated power splitter 1502, an input fiber connector 1504, and a group of output fiber connectors 1506. Optical power splitter 1500 may receive an input signal on input power connector 1504, may split the power, and may output a split power signal on connectors 1506. Optical power splitter 1500 may be coupled to control device 108. Control device 108 may calibrate integrated monitor 1204, may receive status information regarding optical signals passing through integrated monitor 1204, and may control integrated monitor 1204.

Figure 16:
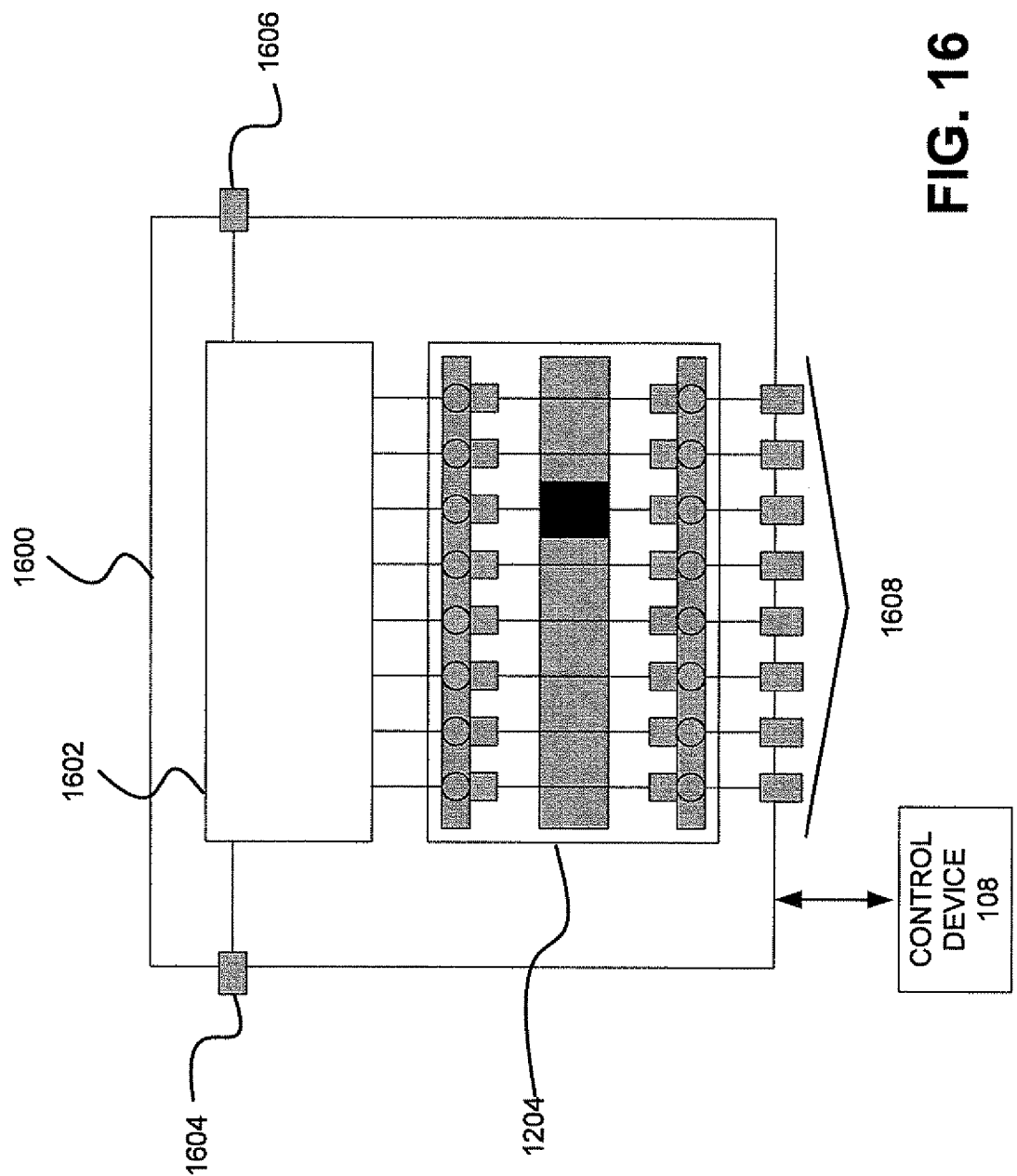
FIG. 16 is a block diagram of an exemplary add/drop module including an integrated fiber monitor.

FIG. 16 is a block diagram of an exemplary add/drop module 1600 including an integrated fiber monitor 1204. Add/drop module 1600 may also include integrated add/drop device 1602, an input fiber connector 1604, an output fiber connector 1606, and a group of add/drop fiber connectors 1608. Add/drop module 1600 may input signals from input fiber connector 1604 and may output signals on output fiber connector 1606. Add/drop module 1600 may input signals from input fiber connector 1604 and may output, i.e., drop, signals on one or more of fiber connectors 1608. Add/drop module 1600 may input signals from one or more of input fiber connector 1608 and may output, i.e., add, signals on output fiber connector 1606. Add/drop module 1600 may be coupled to control device 108, for example, for calibrating, instructing, and receiving data from add/drop module 1600.

Embodiments disclosed herein may provide a long-term optical fiber degradation monitoring system. Embodiments described herein may allow for continuous monitoring of fiber-optic cables. Embodiments disclosed herein may provide remote monitoring without having to send working crews to remote locations.

Macro-bending may provide less power loss than using an optical tap, for example. Further, power loss when using macro-bending may be temporary, e.g., only when a fiber is being bent and measured.

Although cable 102 is shown in FIG. 1 with an array of fibers 112, cable 102 may include a single fiber and monitor 104 may include one set of fiber connectors 302 and one set of tension devices 306.

Although rail 308 is shown in FIG. 3 as one continuous component, rail 308 may include multiple shorter segments. Further, head 310 may also be considered a "rail" in the sense that head 310 may also help bend fibers 312. In addition, although FIG. 3 shows a pair of tension devices 306 for each fiber 312-*x*, in another embodiment only one tension device 306-*x* may be used for each fiber 312-*x*.

Although fixture rail 402 is shown in FIG. 4 as one continuous component, fixture rail 402 may include multiple shorter segments. In addition, although fiber 312-2 is secured to fixture rail 402 using glue, any other method of securing fibers 312 to fixture rail 402 may be used.

Although FIGS. 5B and 5C show two springs 502 in each tension device 306-*x*, one or more than two springs are possible. In addition, springs 502 may be replaced with any device capable of exerting a force.

In one embodiment, there may be a group of photo-detector heads, e.g., a group of photo-detector heads 510. In this embodiment, motor 930 may not have to move head 510 from one fiber to another fiber for measuring leaked light. In one embodiment, there may be as many photo-detector heads as fibers and motor 930 may be omitted. In one embodiment, only one photo detector head may be provided to measure the light in a group of optical fibers. In another embodiment, a group of photo detector heads may be provided to measure the light in the group of fibers. Embodiments disclosed herein may allow for monitoring of fiber cables while introducing only minor insertion loss during measurement. In one embodiment, a receiver may be provided to detect the signal in an optical fiber, e.g., to allow surveillance of communication in the optical fiber.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

While a series of acts has been described above with respect to FIG. 10, the order of the acts may differ in other implementations. Moreover, non-dependent acts may be performed in parallel.

It will be apparent that aspects of the embodiments, as described above, may be implemented in many different forms of software, firmware, and hardware in the implementations illustrated in the figures. The actual software code or specialized control hardware used to implement these embodiments is not limiting of the invention. Thus, the operation and behavior of the embodiments of the invention were described without reference to the specific software code—it being understood that software and control hardware may be designed to implement the embodiments based on the description herein.

Further, certain portions of the invention may be implemented as "logic" that performs one or more functions. This logic may include hardware, such as an application specific integrated circuit, a field programmable gate array, a processor, or a microprocessor, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    bending a first optical fiber of a plurality of optical fibers;
    measuring light leaked from the first optical fiber with a photo detector;
    robotically moving the photo detector from the first optical fiber to a second optical fiber of the plurality of optical fibers;
    bending the second optical fiber of the plurality of fibers; and
    measuring light leaked from the second optical fiber with the photo detector.

2. The method of claim 1 further comprising:
    maintaining the second optical fiber as straight when measuring the light leaked from the first optical fiber; and
    maintaining the first optical fiber as straight when measuring the light leaked form the second optical fiber.

3. The method of claim 1, where measuring the light leaked from the first or second optical fiber comprises measuring the optical power leaked from the first or second optical fiber.

4. The method of claim 3, where measuring the optical power leaked from the first or second optical fiber comprises measuring the optical power leaked from the first or second optical fiber in both directions.

5. The method of claim 3, further comprising:
    passing a known optical power through the first or second optical fiber; and
    determining a relationship between the known optical power and the measured optical power leaked from the first or second optical fiber.

6. The method of claim 5, further comprising:
    passing an unknown optical power through the first or second optical fiber; and
    determining the unknown optical power based on the relationship.

7. The method of claim 6, further comprising transmitting information about the determined optical power to a remote control device.

8. The method of claim 1, further comprising receiving a control signal from a remote control device to measure the light leaked from the first or second optical fiber.

9. A device comprising:
    a first optical fiber and a second optical fiber;
    a rail to bend the first optical fiber and to bend the second optical fiber;
    a photo detector to measure leaked light from the first optical fiber when the first optical fiber is bent by the rail and to measure leaked light from the second optical fiber when the second optical fiber is bent by the rail; and
    a motor to move the photo detector from the first optical fiber to the second optical fiber.

10. The device of claim 9, further comprising:
    a first tension device to maintain the second optical fiber as straight when the photo detector measures the light leaked from the first optical fiber and to maintain the first optical fiber as straight when the photo detector measures the light leaked from the second optical fiber.

11. The device of claim 10, where the photo detector measures optical power leaked from the first or second optical fiber.

12. The method of claim 11, where the photo detector measures optical power leaked from the first or second optical fiber in both directions.

13. The device of claim 11, further comprising:
    processing logic to determine a relationship between a known optical power passed through the first or second optical fiber and the measured optical power leaked from the first or second optical fiber.

14. The device of claim 13, where the processing logic determines an unknown optical power passed through the first or second optical fiber based on the relationship.

15. The device of claim 14, further comprising a transmitter to transmit information about the determined optical power to a remote control device.

16. The device of claim 9, further comprising a second photo detector to measure leaked light from the first optical fiber when the first optical fiber is bent by the rail and to measure leaked light from the second optical fiber when the second optical fiber is bent by the rail.

17. A method comprising:
    bending an optical fiber;
    passing an unknown optical power through the optical fiber;
    measuring an optical power of light leaked from the optical fiber; and
    determining the unknown optical power based on a known relationship between total optical power passed through the optical fiber and leaked power from the optical fiber.

18. The method of claim 17, further comprising:
  determining the known relationship by passing a known optical power through the optical fiber and measuring an optical power of light leaked from the optical fiber carrying the known optical power.

19. The method of claim 17, where measuring the leaked light comprises measuring the light with a photo detector.

20. The method of claim 19, further comprising
  robotically moving the photo detector from the optical fiber to another optical fiber; and
  measuring light leaked from the other optical fiber with the photo detector.

21. An apparatus comprising:
  means for bending a first optical fiber of a plurality of optical fibers;
  means for measuring light leaked from the first optical fiber with a photo detector;
  means for moving the photo detector from the first optical fiber to a second optical fiber of the plurality of optical fibers;
  means for bending the second optical fiber of the plurality of fibers; and
  means for measuring light leaked from the second optical fiber with the photo detector.

22. The method of claim 1, further comprising:
  robotically moving the photo detector from the second optical fiber to a third optical fiber and measuring light leaked from the third optical fiber with the photo detector.

23. The method of claim 5, where determining the relationship between the known optical power and the measured optical power leaked from the first or second optical fiber includes determining a value indicative of a proportion of the measured optical power leaked from the first or second optical fiber to the known optical power.

24. The device of claim 13, where the relationship between a known optical power passed through the first or second optical fiber and the measured optical power leaked from the first or second optical fiber includes a value indicative of a proportion of the measured optical power leaked from the first or second optical fiber to the known optical power.

25. The method of claim 18, where determining the known relationship by passing the known optical power through the optical fiber and measuring the optical power of light leaked from the optical fiber carrying the known optical power includes:
  determining a value indicative of a proportion of light leaked from the optical fiber to the known optical power.

* * * * *